US011057489B2

(12) United States Patent
Xie et al.

(10) Patent No.: US 11,057,489 B2
(45) Date of Patent: Jul. 6, 2021

(54) CONTENT DEPLOYMENT METHOD AND DELIVERY CONTROLLER

(71) Applicant: HUAWEI TECHNOLOGIES CO., LTD., Guangdong (CN)

(72) Inventors: Renchao Xie, Beijing (CN); Junfeng Xie, Beijing (CN); Hualin Zhu, Shanghai (CN); Tao Huang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/600,157

(22) Filed: Oct. 11, 2019

(65) Prior Publication Data

US 2020/0045128 A1 Feb. 6, 2020

Related U.S. Application Data

(63) Continuation of application No. PCT/CN2017/080573, filed on Apr. 14, 2017.

(51) Int. Cl.
*H04L 29/08* (2006.01)
*H04L 29/06* (2006.01)

(52) U.S. Cl.
CPC ........ *H04L 67/2847* (2013.01); *H04L 67/327* (2013.01); *H04L 67/38* (2013.01)

(58) Field of Classification Search
CPC ... H04L 67/2847; H04L 67/327; H04L 67/38; H04L 67/06
See application file for complete search history.

(56) References Cited

U.S. PATENT DOCUMENTS 7,191,332 B1\* 3/2007 Pankajakshan ..... H04L 63/0428
    713/160
7,386,514 B2  6/2008 Major et al.
(Continued)

FOREIGN PATENT DOCUMENTS

AU    2012352651 B2   9/2017
CN     102075358 A    5/2011
(Continued)

OTHER PUBLICATIONS

Stocker, Volker, et al. "The growing complexity of content delivery networks: Challenges and implications for the Internet ecosystem."Telecommunications Policy 41.10 (2017): 1003-1016.*
(Continued)

*Primary Examiner* — Jimmy H Tran
(74) *Attorney, Agent, or Firm* — Womble Bond Dickinson (US) LLP

(57) ABSTRACT

Embodiments of this disclosure provide a content deployment method and a delivery controller. The content deployment method includes: receiving, by a delivery controller, a content deployment request from an application server controller, where the content deployment request includes identification information of requested content and address information of an application server storing the requested content; and sending, by the delivery controller, a first deployment cache request to a first cache server, where the first deployment cache request includes the identification information of the requested content and the address information of the application server, and the first deployment cache request is used to request the first cache server to obtain the requested content from the application server and cache the requested content. With the content deployment method and the delivery controller in the embodiments of
(Continued)

this disclosure, content deployment under control of a content provider can be implemented.

12 Claims, 10 Drawing Sheets

(56) References Cited

U.S. PATENT DOCUMENTS

| | | | | |
|---|---|---|---|---|
| 8,561,102 | B1* | 10/2013 | Mack | H04L 65/4084 |
| | | | | 725/25 |
| 9,137,300 | B1* | 9/2015 | Marshall | H04L 65/602 |
| 9,756,124 | B1* | 9/2017 | Bosch | H04N 21/63 |
| 10,506,262 | B2* | 12/2019 | Ma | H04L 67/2866 |
| 2002/0010798 | A1* | 1/2002 | Ben-Shaul | H04L 67/1021 |
| | | | | 709/247 |
| 2005/0021467 | A1* | 1/2005 | Franzdonk | G06F 21/10 |
| | | | | 705/51 |
| 2006/0059098 | A1 | 3/2006 | Major et al. | |
| 2007/0112676 | A1* | 5/2007 | Kontio | H04L 63/12 |
| | | | | 705/50 |
| 2007/0203841 | A1* | 8/2007 | Maes | H04L 63/10 |
| | | | | 705/52 |
| 2009/0254638 | A1 | 10/2009 | Spatscheck et al. | |
| 2010/0036954 | A1 | 2/2010 | Sakata et al. | |
| 2010/0088405 | A1* | 4/2010 | Huang | H04L 43/0864 |
| | | | | 709/224 |
| 2010/0211776 | A1* | 8/2010 | Gunaseelan | G06F 21/10 |
| | | | | 713/165 |
| 2011/0087844 | A1* | 4/2011 | Elazary | G06F 12/12 |
| | | | | 711/133 |
| 2012/0198071 | A1* | 8/2012 | Black | H04L 67/18 |
| | | | | 709/226 |
| 2012/0215915 | A1* | 8/2012 | Sakata | H04L 67/1021 |
| | | | | 709/224 |
| 2012/0303804 | A1* | 11/2012 | Sundaram | H04L 67/1008 |
| | | | | 709/224 |
| 2013/0268616 | A1* | 10/2013 | Sakata | G06F 15/167 |
| | | | | 709/213 |
| 2014/0047061 | A1* | 2/2014 | Ehrlich | H04L 67/288 |
| | | | | 709/213 |
| 2014/0068264 | A1* | 3/2014 | Lindquist | G06F 21/10 |
| | | | | 713/168 |
| 2014/0165209 | A1* | 6/2014 | Yin | G06F 21/10 |
| | | | | 726/26 |
| 2014/0173135 | A1* | 6/2014 | Varney | H04L 67/2842 |
| | | | | 709/245 |
| 2014/0282788 | A1* | 9/2014 | Inao | H04N 21/8456 |
| | | | | 725/115 |
| 2015/0188994 | A1* | 7/2015 | Marshall | G06F 16/176 |
| | | | | 709/203 |
| 2015/0248455 | A1 | 9/2015 | Sevilla et al. | |
| 2015/0256647 | A1* | 9/2015 | Richardson | G06F 13/00 |
| | | | | 709/219 |
| 2016/0065665 | A1* | 3/2016 | Richardson | H04L 67/1014 |
| | | | | 709/217 |
| 2016/0134694 | A1* | 5/2016 | Berdichevsky | H04L 67/1095 |
| | | | | 709/219 |
| 2016/0198202 | A1* | 7/2016 | Van Brandenburg | H04N 21/4405 |
| | | | | 725/31 |
| 2017/0188054 | A1* | 6/2017 | Ma | H04L 67/02 |
| 2017/0192981 | A1* | 7/2017 | Glover | H04L 67/2842 |
| 2017/0277909 | A1* | 9/2017 | Kraemer | H04N 21/4627 |
| 2017/0311007 | A1* | 10/2017 | Naccache | H04L 65/4076 |
| 2017/0344968 | A1* | 11/2017 | Lientz | H04L 67/2819 |
| 2018/0167444 | A1* | 6/2018 | Sivasubramanian | H04L 67/10 |
| 2018/0213054 | A1* | 7/2018 | Bergman | H04L 67/101 |
| 2018/0262810 | A1* | 9/2018 | Cronk | H04N 21/25875 |
| 2018/0293111 | A1 | 10/2018 | Chen et al. | |
| 2019/0034551 | A1* | 1/2019 | Yanagihara | G06F 16/9574 |
| 2019/0082029 | A1* | 3/2019 | Lipstone | H04L 69/22 |
| 2019/0116155 | A1* | 4/2019 | Bergman | H04L 61/1511 |
| 2019/0342259 | A1* | 11/2019 | Tirpak | H04L 65/4092 |
| 2019/0349446 | A1* | 11/2019 | Lawrence | H04L 67/1014 |
| 2019/0392114 | A1* | 12/2019 | Cholas | H04L 63/08 |
| 2020/0014675 | A1* | 1/2020 | Helms | G06F 21/10 |
| 2020/0195753 | A1* | 6/2020 | Richardson | H04L 67/327 |
| 2020/0302031 | A1* | 9/2020 | Park | H04L 9/088 |
| 2020/0382840 | A1* | 12/2020 | Muvavarirwa | H04N 21/23439 |

FOREIGN PATENT DOCUMENTS

| | | |
|---|---|---|
| CN | 102231749 A | 11/2011 |
| CN | 102244644 A | 11/2011 |
| CN | 102868542 A | 1/2013 |
| CN | 103139236 A | 6/2013 |
| CN | 104219329 A | 12/2014 |
| CN | 104834722 A | 8/2015 |
| CN | 105187848 A | 12/2015 |
| CN | 105577822 A | 5/2016 |
| CN | 105978936 A | 9/2016 |

OTHER PUBLICATIONS

Haßlinger, Gerhard, and Franz Hartleb. "Content delivery and caching from a network provider's perspective." Computer Networks 55.18 (2011): 3991-4006.*

Lou, Xiaosong, and Kai Hwang. "Collusive piracy prevention in P2P content delivery networks." IEEE Transactions on Computers 58.7 (2009): 970-983.*

Iwata, Tetsuya, et al. "A DRM system suitable for P2P content delivery and the study on its implementation." 9th Asia-Pacific Conference on Communications (IEEE Cat. No. 03EX732). vol. 2. IEEE, 2003.*

Mulligan, Deirdre K., John Han, and Aaron J. Burstein. "How DRM-based content delivery systems disrupt expectations of" personal use"." Proceedings of the 3rd ACM workshop on Digital rights management. 2003.*

Sahoo, Jagruti, et al. "A survey on replica server placement algorithms for content delivery networks." IEEE Communications Surveys & Tutorials 19.2 (2016): 1002-1026.*

Xiong, Huijun, et al. "Towards end-to-end secure content storage and delivery with public cloud." Proceedings of the second ACM conference on Data and Application Security and Privacy. 2012.*

* cited by examiner

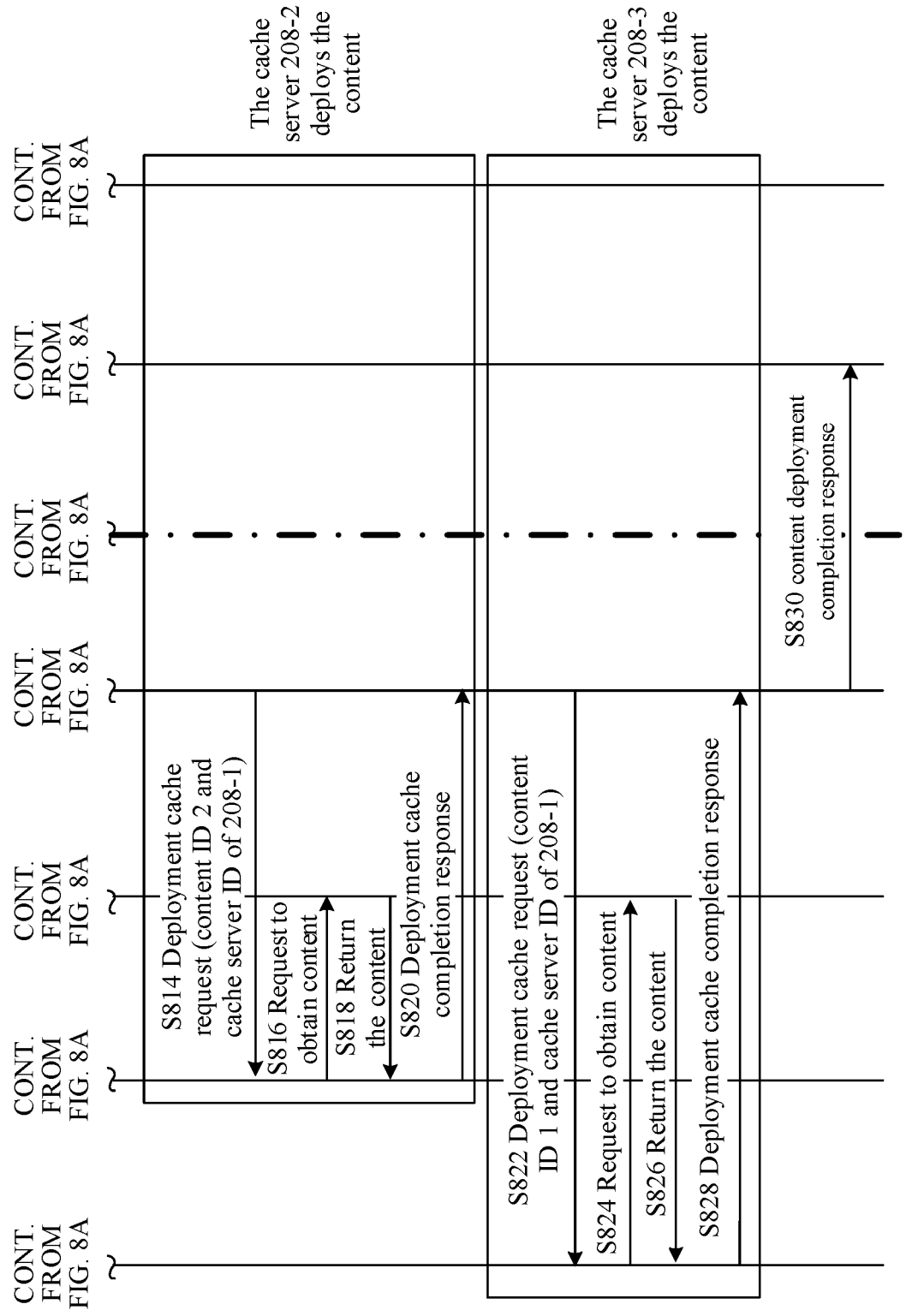

CONTENT DEPLOYMENT METHOD AND DELIVERY CONTROLLER

CROSS-REFERENCE TO RELATED APPLICATION

This disclosure is a continuation of International Application No. PCT/CN2017/080573, filed on Apr. 14, 2017. The disclosure of the aforementioned application is herein incorporated by reference in its entirety.

TECHNICAL FIELD

This disclosure relates to the communications field, and in particular, to a content deployment method and a delivery controller.

BACKGROUND

With the popularity of smartphones, mobile data traffic has explosively increased. In this context, how a cache technology can be used to reduce traffic on a backbone network and a core network and reduce investment of a telecom operator in capacity expansion of mobile network devices becomes an urgent need that needs to be addressed. Therefore, a mobile content delivery network (MCDN) comes into being.

A content delivery network (CDN) is a technology that can deliver content (for example, a video/web page) to a user from a location closer to the user. For example, a video server of Facebook, a social network service website, is deployed in the United States. If a Chinese user wants to access video content of the video server, transmission is subject to a pretty long delay and needs to occupy a lot of network bandwidth resources because the video content is far away from the Chinese user and needs to be transmitted between the United States and China. In the CDN technology, content such as videos/web pages of the video server of the Facebook can be deployed in a place closer to the Chinese user, for example, a Chinese city (for example, Beijing), allowing the Chinese user to obtain the content directly from that city. This can not only shorten the transmission delay, but also lower occupation of network bandwidth resources.

SUMMARY

Embodiments of this disclosure provide a novel content deployment method and a novel delivery controller, so as to implement content deployment under control of a content provider.

According to a first aspect, a content deployment method is provided and includes: receiving, by a delivery controller, a content deployment request from an application server controller, where the content deployment request includes identification information of requested content and address information of an application server storing the requested content; and sending, by the delivery controller, a first deployment cache request to a first cache server, where the first deployment cache request includes the identification information of the requested content and the address information of the application server, and the first deployment cache request is used to request the first cache server to obtain the requested content from the application server and cache the requested content.

In one embodiment, the content deployment request further includes deployment area information, and the method further includes: determining, by the delivery controller, the first cache server from a deployment area indicated by the deployment area information; and/or the content deployment request further includes identification information of the first cache server, and the method further includes: determining, by the delivery controller, the first cache server based on the identification information of the first cache server.

In one embodiment, the method further includes: sending, by the delivery controller, a second deployment cache request to a second cache server, where the second deployment cache request includes the identification information of the first cache server and the identification information of the requested content, and the second deployment cache request is used to request the second cache server to obtain the requested content from the first cache server and cache the requested content.

In one embodiment, the method further includes: determining, by the delivery controller, segment identification information of the requested content; and sending, by the delivery controller, a third deployment cache request to each of at least two third cache servers, where the third deployment cache request includes the identification information of the first cache server and the segment identification information of the requested content, and the third deployment cache request is used to request the third cache server to obtain a segment of the requested content from the first cache server and cache the segment of the requested content.

According to a second aspect, a content deployment method is provided and includes: receiving, by a delivery controller, a content deployment request from an application server controller, where the content deployment request includes identification information of requested content and address information of an application server storing the requested content; determining, by the delivery controller, segment identification information of the requested content; and sending, by the delivery controller, a first deployment cache request to each of at least two first cache servers, where the first deployment cache request includes the address information of the application server and the segment identification information of the requested content, and the first deployment cache request is used to request the first cache server to obtain a segment of the requested content from the application server and cache the segment of the requested content.

In one embodiment, the content deployment request further includes deployment area information, and the method further includes: determining, by the delivery controller, the first cache server from a deployment area indicated by the deployment area information; and/or the content deployment request further includes identification information of the first cache server, and the method further includes: determining, by the delivery controller, the first cache server based on the identification information of the first cache server.

According to a third aspect, a delivery controller is provided and includes: a deployment request receiving unit, configured to receive a content deployment request from an application server controller, where the content deployment request includes identification information of requested content and address information of an application server storing the requested content; and a cache request sending unit, configured to send a first deployment cache request to a first cache server, where the first deployment cache request includes the identification information of the requested content and the address information of the application server, and the first deployment cache request is used to request the first cache server to obtain the requested content from the application server and cache the requested content.

In one embodiment, the content deployment request further includes deployment area information, and the cache request sending unit is further configured to determine the first cache server from a deployment area indicated by the deployment area information; and/or the content deployment request further includes identification information of the first cache server, and the cache request sending unit is further configured to determine the first cache server based on the identification information of the first cache server.

In one embodiment, the cache request sending unit is further configured to send a second deployment cache request to a second cache server, where the second deployment cache request includes the identification information of the first cache server and the identification information of the requested content, and the second deployment cache request is used to request the second cache server to obtain the requested content from the first cache server and cache the requested content.

In one embodiment, the cache request sending unit is further configured to: determine segment identification information of the requested content; and send a third deployment cache request to each of at least two third cache servers, where the third deployment cache request includes the identification information of the first cache server and the segment identification information of the requested content, and the third deployment cache request is used to request the third cache server to obtain a segment of the requested content from the first cache server and cache the segment of the requested content.

According to a fourth aspect, a delivery controller is provided and includes: a deployment request receiving unit, configured to receive a content deployment request from an application server controller, where the content deployment request includes identification information of requested content and address information of an application server storing the requested content; and a cache request sending unit, configured to determine segment identification information of the requested content and send a first deployment cache request to each of at least two first cache servers, where the first deployment cache request includes the address information of the application server and the segment identification information of the requested content, and the first deployment cache request is used to request the first cache server to obtain a segment of the requested content from the application server and cache the segment of the requested content.

In one embodiment, the content deployment request further includes deployment area information, and the cache request sending unit is further configured to determine the first cache server from a deployment area indicated by the deployment area information; and/or the content deployment request further includes identification information of the first cache server, and the cache request sending unit is further configured to determine the first cache server based on the identification information of the first cache server.

According to a fifth aspect, a delivery controller is provided and includes: a communications interface, a memory storing a computer executable instruction, and a processor that implements any one of the content deployment methods according to the first and second aspects when executing the computer executable instruction.

Herein, in response to the content deployment request from the application server controller, the delivery controller controls the first cache server to obtain and cache all or some of the requested content stored in the application server.

Therefore, the first cache server caches content of a content provider with permission of the content provider. With the content deployment method and the delivery controller in the embodiments of this disclosure, content deployment under control of the content provider can be implemented.

DETAILED DESCRIPTION OF THE EMBODIMENTS

Herein, example implementations are described more completely with reference to the accompanying drawings. In the figures, thickness of areas and layers may be exaggerated for clarity. In the figures, identical reference signs denote identical or similar structures, and therefore detailed descriptions thereof are omitted.

Furthermore, the described features, structures, or characteristics may be combined in one or more embodiments in any proper manner. In the following description, many specific details are provided to help fully understand the embodiments of this disclosure. However, a person skilled in the art is aware that the technical solutions of this disclosure can be practiced without one or more specific details, or other methods, components, materials, or the like can be used. In other cases, commonly-known structures, materials, or operations are not shown or described in detail to avoid obscuring the main technical creative idea of this disclosure.

It should be noted that the embodiments in this disclosure and the features in the embodiments may be combined with each other in the case of no conflict. This disclosure is described in detail below with reference to the accompanying drawings and the embodiments.

Figure 1:
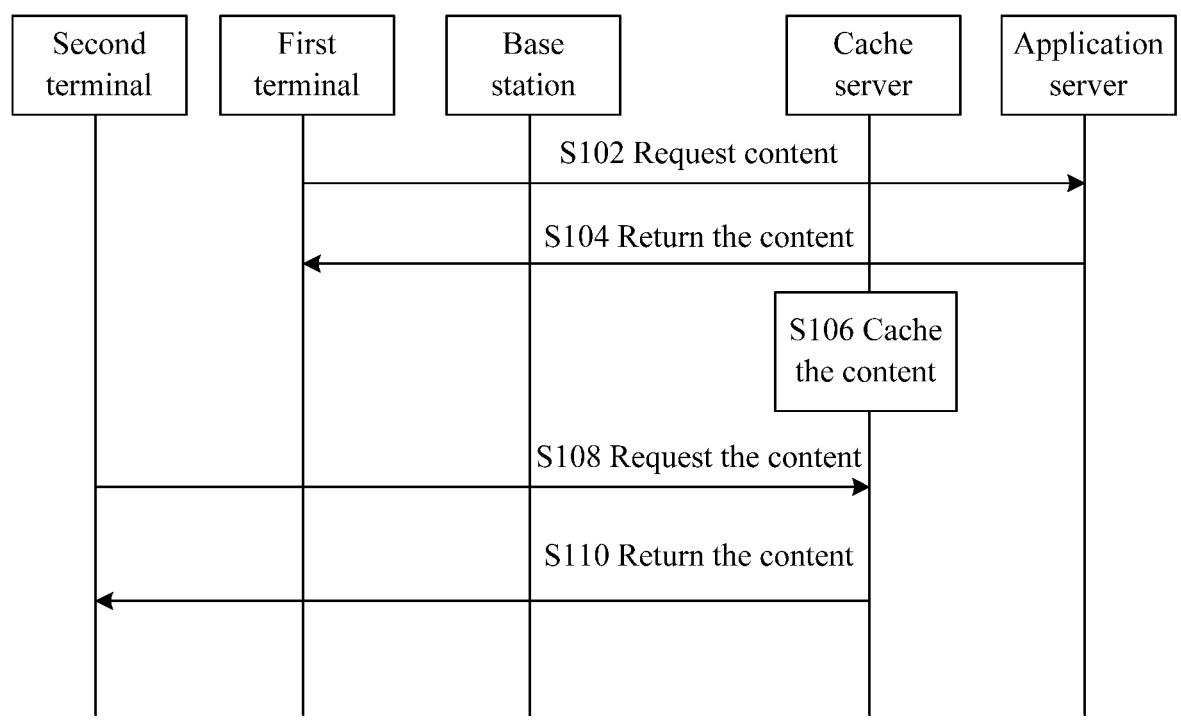
FIG. 1 is a schematic diagram of a content delivery process in a conventional MCDN.

FIG. 1 is a schematic diagram of a content delivery process in a conventional MCDN. As shown in FIG. 1, the content delivery process in the conventional MCDN includes the following operations. In operation S102, a first terminal requests content from an application server operation S104, the application server returns the content to the first terminal. In operation S106, in a process that the application server transmits the content to the first terminal, a cache server caches the content. S108: A second terminal requests the content from the cache server. In operation S110, the cache server returns the content to the second terminal.

It should be noted that the first terminal and the second terminal may be one terminal, or may be different terminals. Herein, the first terminal and the second terminal are distinguished for clarity. They are intended to explain that subsequently any terminal can obtain the content from the cache server provided that a terminal has requested the content from the application server and the cache server has cached the content.

In the content delivery process shown in FIG. 1, the second terminal may obtain the content from a cache server in a closer location, with no need to obtain the content from a remote application server, thereby reducing a transmission delay and saving network bandwidth resources. However, as shown in operation S106 in FIG. 1, the cache server caches the content autonomously. This is likely to involve infringement. That is, caching the content without permission of the content provider may result in infringement.

In view of one or more of the foregoing problems of the content delivery process in the conventional MCDN shown in FIG. 1, a novel content delivery system, a novel delivery controller used in the content delivery system, and a novel content deployment method implemented by the delivery controller are provided. A content provider can work along with a network provider to jointly deploy content of the content provider to a cache server of the network provider, thereby avoiding infringing related legal rights of the content provider due to active caching of the content of the content provider by the cache server of the network provider.

The content delivery system, the delivery controller used in the content delivery system, and the content deployment method implemented by the delivery controller in the embodiments of this disclosure are described in detail below with reference to the accompanying drawings.

Figure 2:
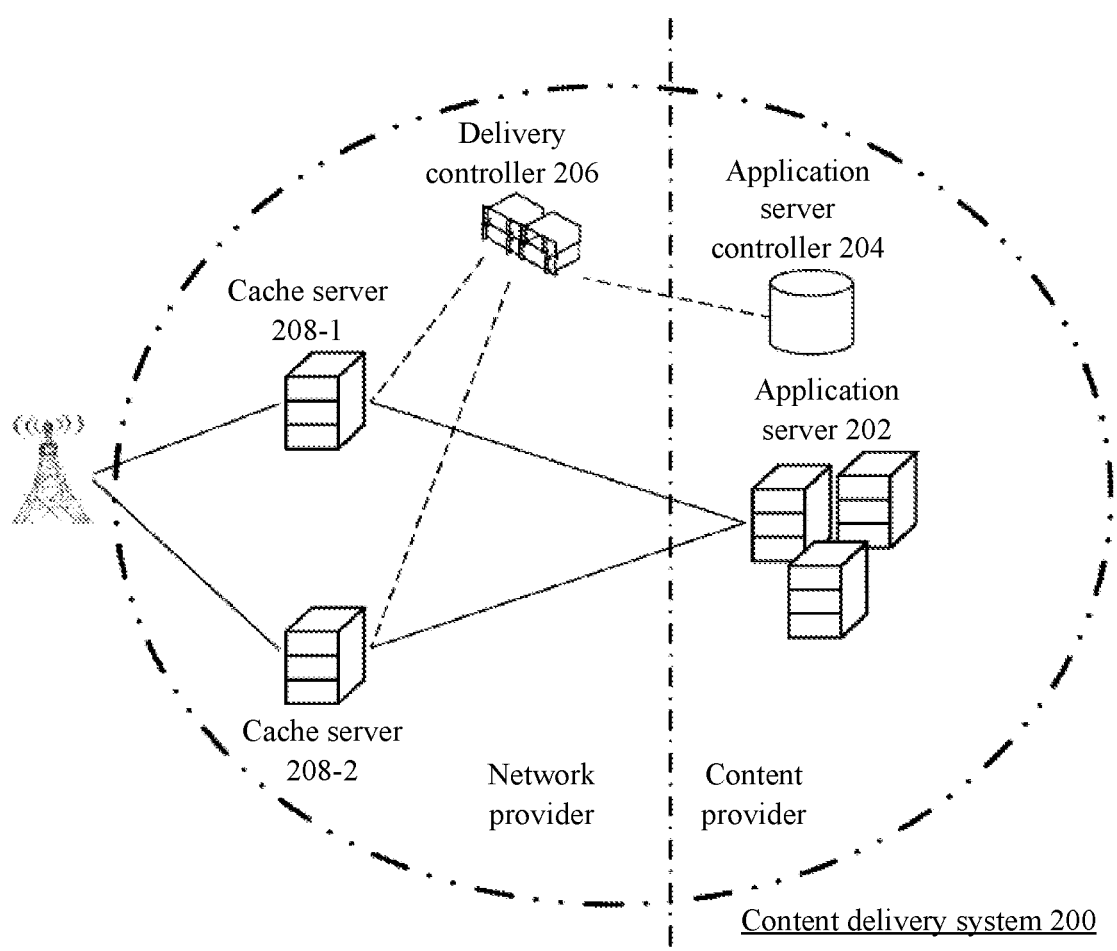
FIG. 2 is a schematic diagram of a system architecture of a content delivery system according to an embodiment of this disclosure.

FIG. 2 is a schematic diagram of a system architecture of a content delivery system according to an embodiment of this disclosure. As shown in FIG. 2, the content delivery system 200 in this embodiment of this disclosure includes an application server (AS) 202, an application server controller (AS Controller) 204, a delivery controller 206, and one or more cache servers 208 (only two cache servers 208-1 and 208-2 are shown as examples). The application server 202 is configured to store content provided by a content provider. The application server controller 204 is configured to send a content deployment request to the delivery controller 206 when content (referred to as content A below for ease of description) stored in the application server 202 is to be deployed to the one or more cache servers 208. The delivery controller 206 is configured to send, in response to the content deployment request sent by the application server controller 204, a deployment cache request for all content or a corresponding segment of the content A deployed in these cache servers to each of the one or more cache servers 208. The one or more cache servers 208 are configured to obtain, in response to the deployment cache request sent by the delivery controller 206, all the content or the corresponding segment of the content A from the application server 202 or another cache server and cache all the obtained content or the obtained corresponding segment of the content A.

In one embodiment, the content provider owns related legal rights to the content stored in the application server 202. The application server 202 and the application server controller 204 belong to the content provider. The delivery controller 206 and the cache servers 208 belong to the network provider. The application server 202, the application server controller 204, the delivery controller 206, and the one or more cache servers 208 can deploy all the content or the corresponding segment of the content A stored in the application server 202 onto the one or more cache servers 208 through mutual interaction.

In one embodiment, both the application server 202 and the application server controller 204 are controlled by the content provider, including, what content is to be stored in the application server 202, whether the application server controller 204 sends a content deployment request to the delivery controller 206, and a content deployment request for what content to be sent can be controlled by the content provider. The application server 202 and the application server controller 204 may be integrated and deployed in one physical device or may be respectively deployed in different physical devices, and may be integrated and deployed in one geographical location or may be respectively deployed in different geographical locations. The application server 202 and application server controller 204 are logical concepts rather than physical concepts. In an actual implementation, the application server 202 may include one or more physical servers. The application server controller 204 may be a central controller that controls all physical servers acting as the application server 202 together, or may include one or more distributed controllers that respectively control the one or more physical servers acting as the application server 202.

In the content delivery system shown in FIG. 2, the delivery controller 206 controls, in response to the content deployment request of the application server controller 204, the one or more cache controllers 208 to obtain and cache all the content or the corresponding segment of the content A stored in the application server 202. Therefore, the one or more cache controllers 208 cache all the content or the corresponding segment of the content A of the content provider under permission of the content provider.

It should be understood by a person skilled in the relevant art that the content delivery system in this embodiment of this disclosure is applicable to a scenario in which all content providers actively deploy content to a network provider. The content delivery system in this embodiment of this disclosure is not limited to the system architecture shown in FIG. 2, but covers various system architectures that operate in accordance with the foregoing working principle. For example, the content delivery system in this embodiment of this disclosure can be implemented in a 5G/6G network, a long term evolution (LTE) network, a fixed network, a MulteFire network, a home eNodeB network, a non-3 GPP (for example, Wi-Fi) access mobile network, a global system for mobile communications (GSM) network, a wideband code division multiple access (WCDMA) network, or the like.

Generally, to deploy the content A stored in application server 202 onto the one or more cache servers 208, the application server controller 204 may add identification information of the content A and address information of the application server 202 to a content deployment request (referred to as content deployment content Q below for ease of description) sent to the delivery controller 206. That is, the content deployment request Q may include the identification information of the content A and the address information of the application server 202. In this case, the delivery controller 206 may determine, in a random manner or according to a cache server selection rule, one or more cache servers from cache servers that have signal connections to the delivery controller, and send a deployment cache request to the determined one or more cache servers.

In some scenarios, to deploy the content A stored in the application server 202 to a deployment area (referred to as a deployment area L below for ease of description) specified by the content provider, the application server controller 204 may add location information of the deployment area L (namely, deployment area information) to the content deployment request Q, in addition to the identification information of the content A and the address information of the application server 202 that are added to the content deployment request Q. That is, the content deployment request Q may include the identification information of the content A, the address information of the application server 202, and the deployment area information. In this case, the delivery controller 206 may determine one or more cache servers from the deployment area L indicated by the deployment area information, and send a deployment cache request to the determined one or more cache servers.

In some scenarios, to deploy the content A stored in the application server 202 to the one or more cache servers 208 (for example, the cache servers 208-1 and 208-2) specified by the content provider, the application server controller 204 can add identification information of the cache servers 208-1 and 208-2 to the content deployment request Q, in addition to the identification information of the content A and the address information of the application server 202 that are added to the content deployment request Q. That is, the content deployment request Q may include the identification information of the content A, the address information of the application server 202, and the identification information of the cache servers 208-1 and 208-2. In this case, the delivery controller 206 may directly send a deployment cache request to each of the cache servers 208-1 and 208-2, with no need to select the cache servers.

In one embodiment, the identification information of the content A may be a uniform resource identifier (URI) of the content A, a uniform resource locator, or other information identifying the content. The deployment area information may be administrative area identification information corresponding to the deployment area L, geographical area identification information, or other information indicating a location of the deployment area L. The address information of the application server 202 may be an internet protocol (IP) address of the application server 202, or may be other information indicating an address of the application server. In some cases, the identification information of the content A and the address information of the application server 202 may be combined. For example, the URL of the content A includes both the identification information of the content A and the address information of the application server 202.

Figure 3:
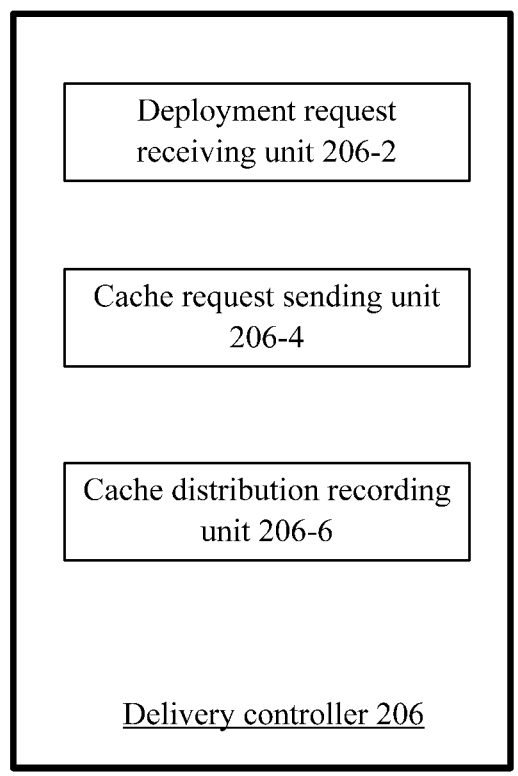
FIG. 3 is a schematic block diagram of a delivery controller according to an embodiment of this disclosure.

FIG. 3 is a schematic block diagram of a delivery controller according to an embodiment of this disclosure. A delivery controller used in a content delivery system and a content deployment method implemented by the delivery controller in the embodiments of this disclosure are described in detail below with reference to the accompanying drawings.

As shown in FIG. 3, a delivery controller 206 in this embodiment of this disclosure includes a deployment request receiving unit 206-2 and a cache request sending unit 206-4. The deployment request receiving unit 206-2 is configured to receive a content deployment request Q from an application server 204. The content deployment request Q includes identification information of content A and address information of an application server 202. The cache request sending unit 206-4 is configured to send a deployment cache request to one or more cache servers 208 (referred to as cache servers 208-m to 208-n below for ease of description, where m and n are integers greater than 0).

In some scenarios, the delivery controller 206 may control the cache servers 208-m to 208-n to separately obtain all content or a corresponding segment of the content A from the application server 202, or may control at least one (for example, a cache server 208-j, where j is an integer greater than 0) of the cache servers 208-m to 208-n to obtain all content of the content A from the application server 202 and control another cache server of the cache servers 208-m to 208-n to obtain all the content or a corresponding segment of content A from the cache server 208-j.

In some scenarios, for each of the cache servers 208-m to 208-n, whether the cache server obtains the content A from the application server 202 or from another cache server, whether to obtain all the content or the corresponding segment of the content A, and which segment of the content A to be obtained are determined by the cache request sending unit 206-4, and are specified in a deployment cache request sent to the cache server.

In the following, for ease of description, a cache server that obtains all the content or the corresponding segment of the content A from the application server 202 is referred to as a first cache server. A cache server that obtains all the content of the content A from the first cache server is referred to as a second cache server. A cache server that obtains the corresponding segment of the content A from the first cache server is referred to as a third cache server. It should be understood that the first, second, and third cache servers may have same or different physical or logical structures. Herein, the first, second, and third cache servers are distinguished only based on different content sources from which the cache servers obtain all the content or the corresponding segments of the content A.

To enable the first cache server 208-j of the cache servers 208-m to 208-n to obtain all the content of the content A from the application server 202, the cache request sending unit 206-4 may generate a first deployment cache request for the first cache server 208-j based on the identification information of the content A and the address information of the application server 202, and send the first deployment cache request to the first cache server 208-j, so that the first cache server 208-j obtains all the content of the content A from the application server 202 based on the identification information of the content A and the address information of the application server 202 and caches all the content of the content A.

To enable the first cache server 208-j of the cache servers 208-m to 208-n to obtain a corresponding segment A-j of the content A from the application server 202, the cache request sending unit 206-4 may generate segment identification information of the segment A-j based on the identification information of the content A and range information of the segment A-j, and then generates a first deployment cache request for the first cache server 208-j based on the segment identification information of the segment A-j and the address information of the application server 202, and sends the first deployment cache request to the first cache server 208-j, so that the first cache server 208-j obtains the segment A-j from the application server 202 based on the segment identification information of the segment A-j and the address information of the application server 202.

To enable a second cache server 208-i (where i is an integer greater than 0) of the cache servers 208-m to 208-n to obtain all the content of the content A from the first cache server 208-j, the cache request sending unit 206-4 may generate a second deployment cache request for the second cache server 208-i based on the identification information of the content A and identification information of the first cache server 208-j, and send the second deployment cache request to the second cache server 208-i, so that the second cache server 208-i obtains all the content of the content A from the first cache server 208-j based on the identification information of the content A and the identification information of the first cache server 208-j.

To enable a third cache server 208-k (where k is an integer greater than 0) of the cache servers 208-m to 208-n to obtain a corresponding segment A-k of the content A from the first cache server 208-j, the cache request sending unit 206-4 may generate segment identification information of the segment A-k based on the identification information of the content A and range information of the segment A-k, and then generate a third deployment cache request for the third cache server 208-k based on the segment identification information of the segment A-k and the identification information of the first cache server 208-j, and send the third deployment cache request to the third cache server 208-k, so that the third cache server 208-k obtains the segment A-k from the first cache server 208-j based on the segment identification information of the segment A-k and the identification information of the first cache server 208-j.

In one embodiment, in a process of generating a deployment cache request for the cache servers 208-m to 208-n, the cache request generation unit 206-4 first determines one or more cache servers that have signal connections to the delivery controller 206 as the cache servers 208-m to 208-n. When the content cache request Q merely includes the identification information of the content A and the address information of the application server 202, the cache request sending unit 206-4 may determine, in a random manner or according to a cache server selection rule of the delivery controller 206, the cache servers 208-m to 208-n in the content delivery system 200 as cache servers to which the content A is to be deployed. When the content cache request Q includes deployment area information specified by the content provider, in addition to the identification information of the content A and the address information of the application server 202, the cache request sending unit 206-4 may determine the cache servers 208-m to 208-n in a deployment area L, indicated by the deployment area information, in the content delivery system 200 as cache servers in which the content A is to be deployed. When the content cache request Q includes identification information of a cache server specified by the content provider, in addition to the identification information of the content A and the address information of the application server 202, the cache request generation unit 206-4 determines a cache server corresponding to the identification information, included in the content cache request Q, of the cache server as a cache server of the content A, with no need to perform a cache server selection function.

Optically, the delivery controller 206 in this embodiment of this disclosure may further include a cache distribution recording unit 206-6, configured to record a distribution status of the content A in the cache servers 208-m to 208-n. For example, when receiving a deployment cache completion response from the cache servers 208-m to 208-n, the cache distribution recording unit 206-6 may record, a correspondence between the identification information of the content A and identification information of a cache server storing the content A, or a correspondence between the identification information of the corresponding segment of the content A and identification information of a cache server storing the corresponding segment of the content A.

Specific details of the content deployment method implemented by the delivery controller 206 are the same as specific details of the corresponding function modules in the delivery controller 206, and therefore no more details are described herein.

FIG. 4 to FIG. 8B are schematic diagrams of example content delivery processes in a content delivery system according to embodiments of this disclosure. These content delivery processes are described in detail below with reference to the accompanying drawings.

Figure 4:
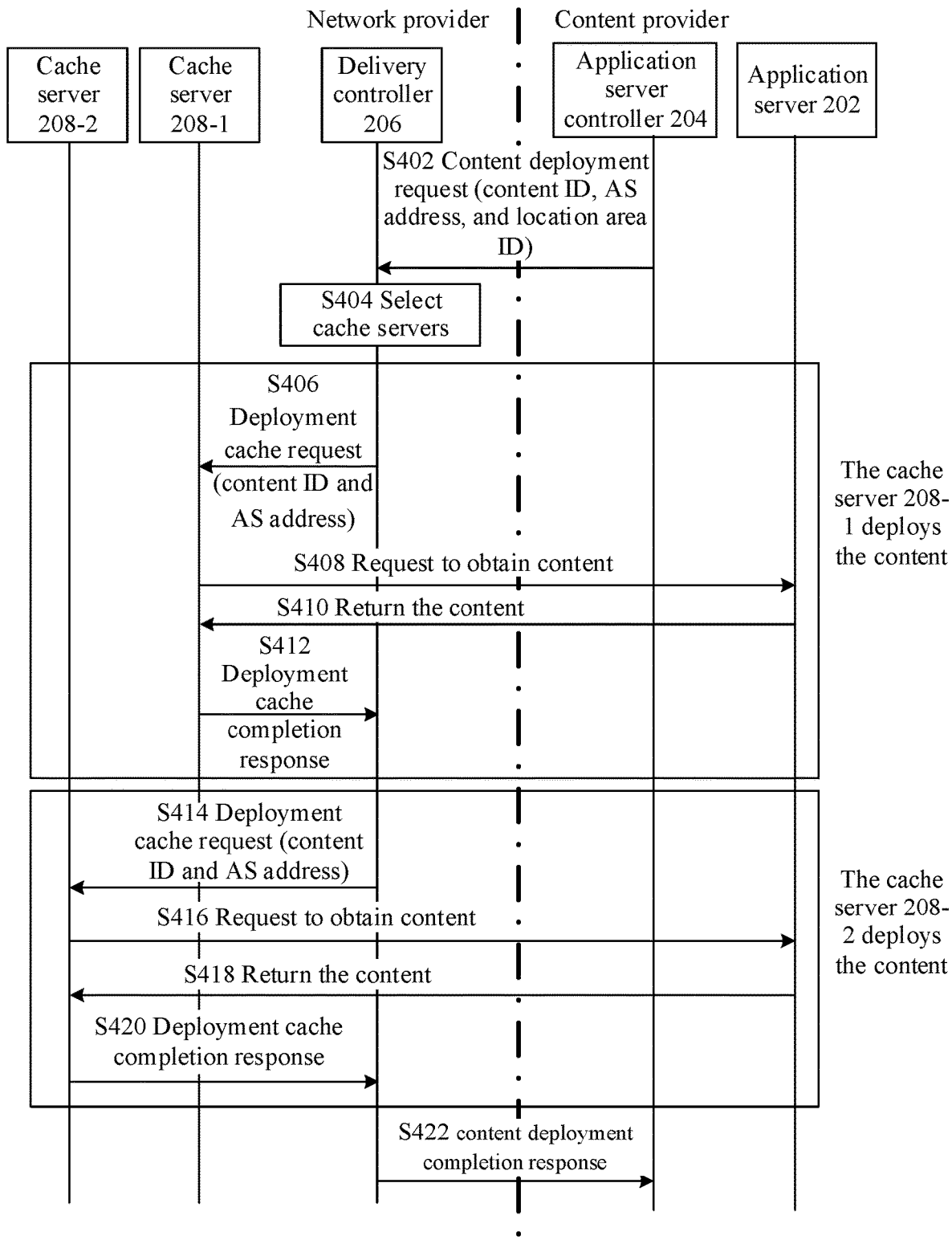
FIG. 4 to FIG. 8B are schematic diagrams of example content delivery processes in a content delivery system according to embodiments of this disclosure.

As shown in FIG. 4, an example content deployment process implemented in the content delivery system 200 in this embodiment of this disclosure includes the following operations.

In operation S402, an application server controller 204 sends a content deployment request for content A to a delivery controller 206, where the content deployment request includes identification information of the content A (content ID), deployment area information (location area ID), and address information of the application server 202 (AS address).

In operation S404, the delivery controller 206 selects cache servers (for example, cache servers 208-1 and 208-2) based on the location area ID.

Operations S406 to S412 are a content deployment process of the cache server 208-1. The delivery controller 206 sends a deployment cache request to the cache server 208-1, to request the cache server 208-1 to obtain all content of the content A from the application server 202. The deployment cache request includes the content ID and the AS address. The cache server 208-1 obtains all the content of the content A from the application server 202 based on the content ID and the AS address, and after completing caching the content A, returns a deployment cache completion response to the delivery controller 206.

Operations S414 to S420 are a content deployment process of the cache server 208-2, similar to the content deployment process of the cache server 208-1 shown in operations S406 to S412.

In operation S422, after receiving the deployment cache completion responses from the cache servers 208-1 and 208-2, the delivery controller 206 returns a content deployment completion response to the application server controller 204 and updates a cache distribution record stored in the delivery controller.

Figure 5:
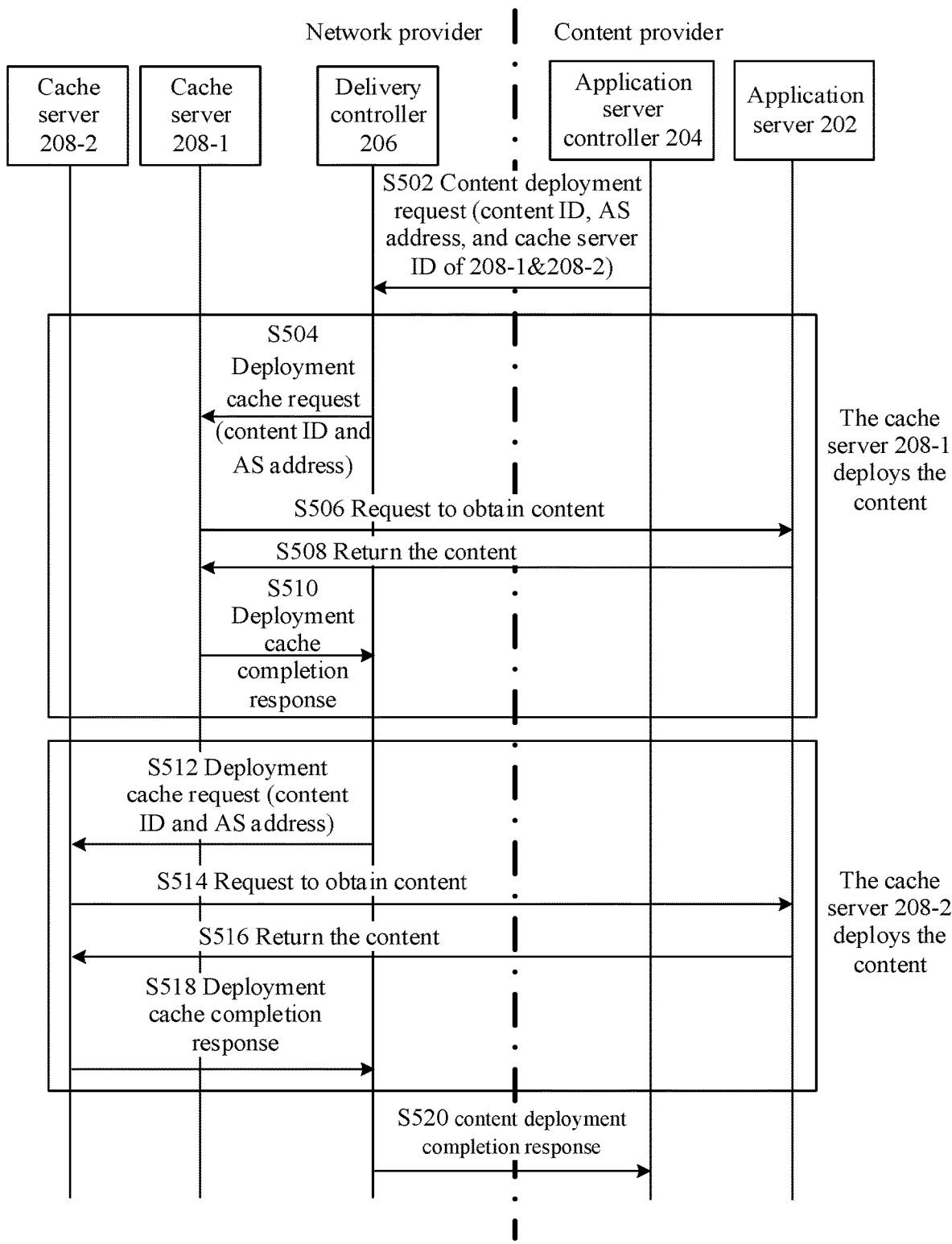

A content deployment process shown in FIG. 5 differs from the content deployment process shown in FIG. 4 in that the content deployment request sent to the delivery controller 206 by the application server controller 204 includes identification information of the cache servers 208-1 and 208-2 (Cache Server ID) in addition to the content ID and the AS address, but not the location area ID. That is, the application server controller 204 has specified the cache servers 208-1 and 208-2 in which the content A is to be deployed. Therefore, the delivery controller 206 does not need to select cache servers. Other content in FIG. 5 is the same as the corresponding content in FIG. 4, and details are not described herein again.

Figure 6:
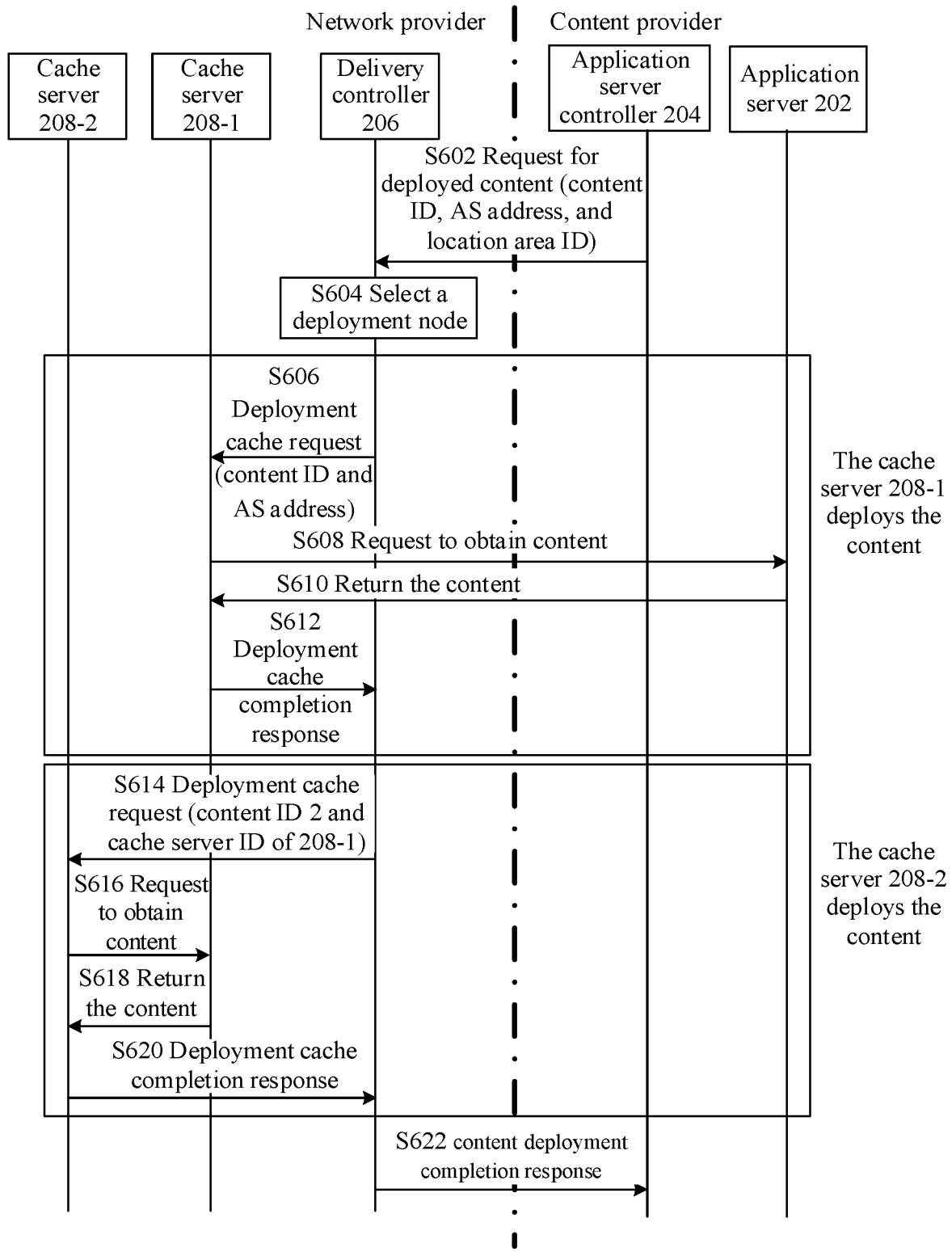

A content deployment process shown in FIG. 6 differs from the content deployment process shown in FIG. 4 in that the delivery controller 206 sends a deployment cache request to the cache server 208-2, to request the cache server 208-2 to obtain the content A from the cache server 208-1 rather than the application server 202 (the cache server 208-1 has obtained and cached the content A in operations S606 to S612). Herein, the identification information of the content A included in the deployment cache request sent by the delivery controller 206 in operation S614 is content ID 2 rather than the content ID. Herein, both the content ID and the content ID 2 are the identification information of the content A, but may have different representation forms due to being generated by different network elements. For example, when a URL is used as the identification information of the content A, the content ID and the content ID 2 are not the same although both are the identification information of the content A. Other content in FIG. 6 is the same as the corresponding content in FIG. 5, and details are not described herein again.

Figure 7:
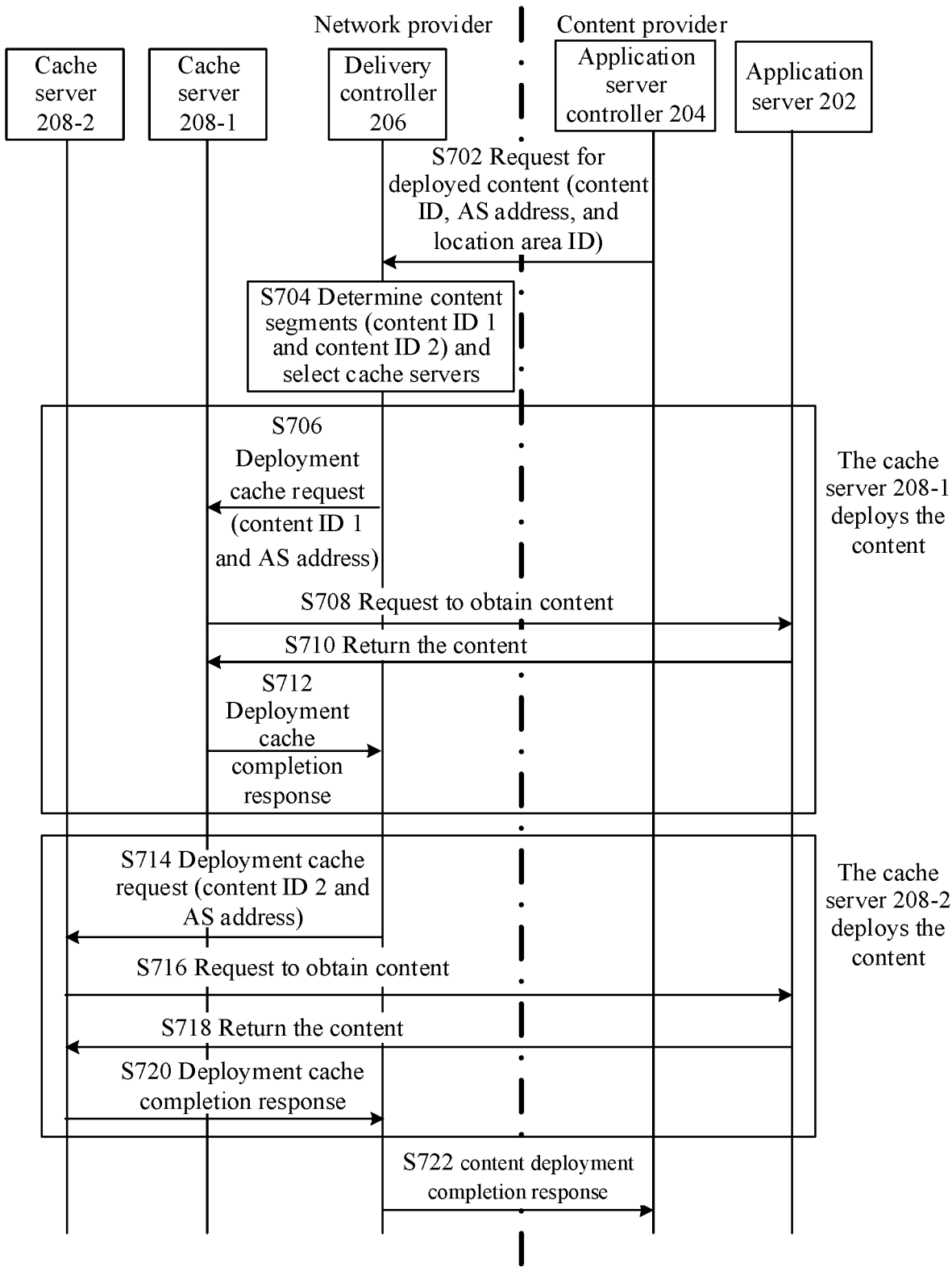

A content deployment process shown in FIG. 7 differs from the content deployment process shown in FIG. 4 in that the delivery controller 206 segments the content A and controls the cache servers 208-1 and 208-2 to obtain different segments of the content A from the application server 202 and cache the different segments of the content A. Herein, the delivery controller 206 controls the cache server 208-1 to obtain a first segment (whose identification information is content ID 1) from the application server 202 and cache the first segment, and controls the cache server 208-2 to obtain a second segment (whose identification information is content ID 2) from the application server 202 and cache the second segment. Other content in FIG. 7 is the same as the corresponding content in FIG. 4, and details are not described herein again.

Figure 8A:
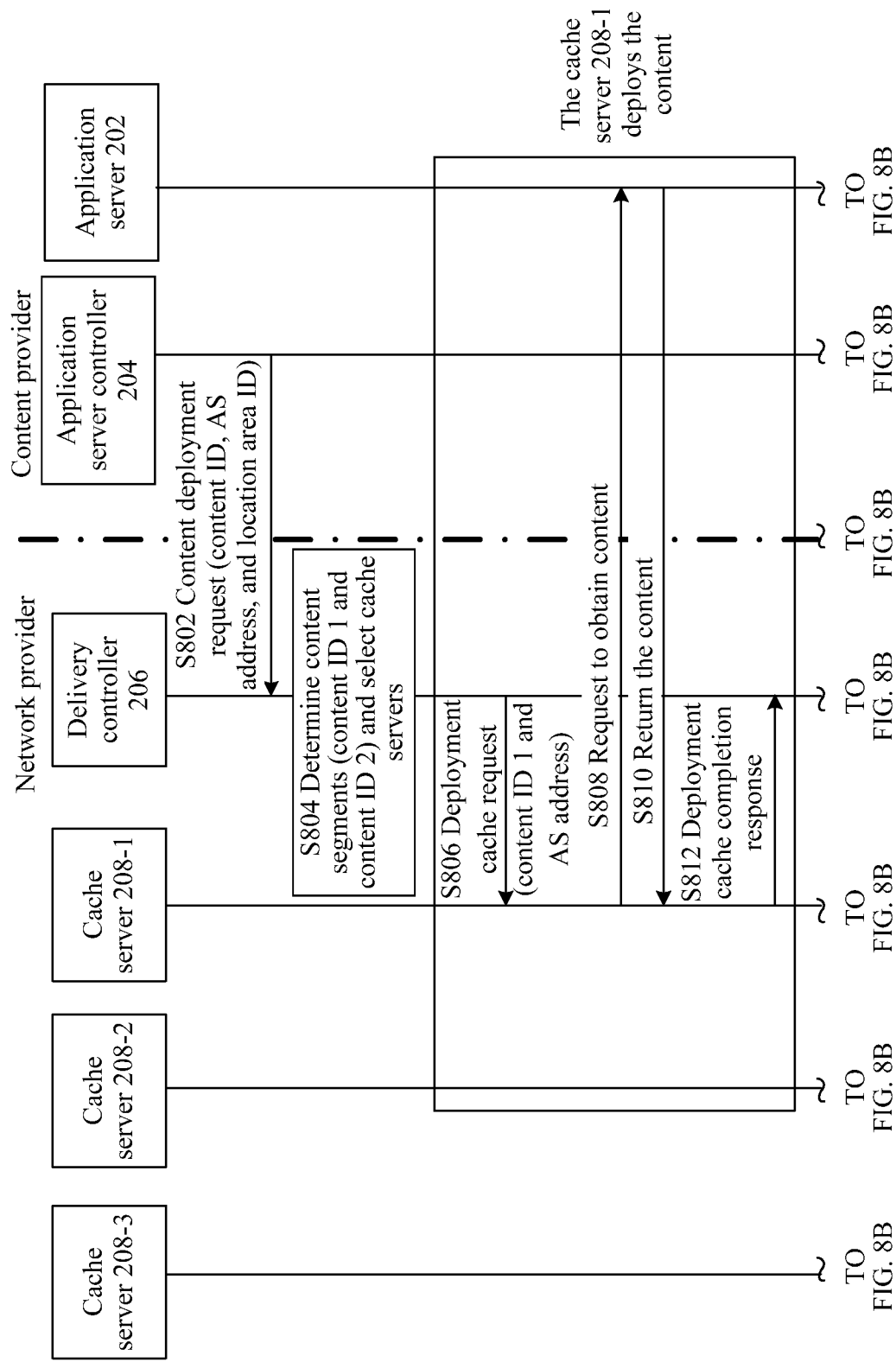

A content deployment process shown in FIG. 8A and FIG. 8B differs from the content deployment process shown in FIG. 4 in that a cache server 208-3 is added. The delivery controller 206 segments the content A, controls the cache server 208-1 to obtain all the content of the content A from the application server 202 and cache all the content of the content A, and controls the cache servers 208-2 and 208-3 to obtain different segments of the content A from the cache server 208-1 and cache the different segments of the content A. Herein, the delivery controller 206 controls the cache server 208-2 to cache a first segment, and controls the cache server 208-3 to cache a second segment, where the first segment and the second segment may be parts of the content A, or may be all parts of the content A. Other content in FIG. 8A and FIG. 8B is the same as the corresponding content in FIG. 4, and details are not described herein again.

It should be noted that the aforementioned numbers of the cache servers and those of the segments corresponding to the cache servers are merely intended to distinguish these cache servers and the segments corresponding to the cache servers, without imposing a limitation on any logical or connection relationship. In addition, step numbers in FIG. 4 to FIG. 8B do not mean that these operations need to be performed in a sequence indicated by the numbers. Actually, these operations may be performed in another sequence provided that processing including the deployment cache request, requesting to obtain content, content returning, and deployment cache completion response can be implemented for a corresponding cache server. Similarly, numbers of other related network elements in the foregoing description are merely intended to distinguish these network elements, without imposing a limitation thereon.

According to the content delivery system, the delivery controller used in the content delivery system, and the content deployment method implemented by the delivery controller in the embodiments of this disclosure, a content provider works along with a network provider to jointly deploy content of the content provider to a cache server of the network provider, so as to implement content deployment under control of the content provider.

Figure 9:
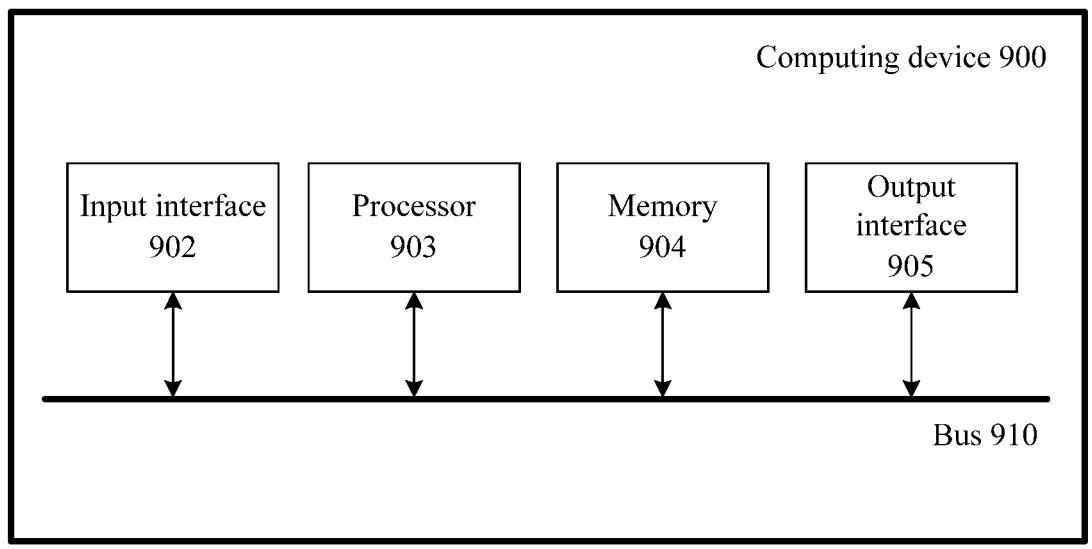
FIG. 9 is a schematic structural diagram of an example hardware architecture of a computing device that can implement a delivery controller and a content deployment method of the delivery controller according to an embodiment of this disclosure.

Each network element in the content delivery system described in FIG. 1 to FIG. 8B may be implemented by a computing device. For example, FIG. 9 is a schematic diagram of an example hardware architecture of a computing device that can implement the delivery controller according to an embodiment of this disclosure. As shown in FIG. 9, the computing device 900 includes an input interface 902, a processor 903, a memory 904, and an output interface 905. The input interface 902, the processor 903, the memory 904, and the output interface 905 are connected to each other through a bus 910.

In one embodiment, the input interface 902 and the output interface 905 may be two separate interfaces, or may be one communications interface. The memory, includes but is not limited to a random access memory (RAM), a read-only memory (ROM), an erasable programmable read only memory (EPROM), or a compact disc read-only memory (CD-ROM), and is used for a related instruction and data. The processor may be one or more central processing units (CPU). When the processor is a CPU, the CPU may be a single-core CPU, or may be a multi-core CPU.

To be specific, the delivery controller 206 in this embodiment of this disclosure may be alternatively implemented to include: a communications interface, a memory storing a computer executable instruction, and a processor. When executing the computer executable instruction, the processor is capable of implementing the delivery controller and the content deployment method of the delivery controller that are described with reference to FIG. 3 and FIG. 4.

It should be clarified that this disclosure is not limited to a specific configuration and processing described above and shown in the figures. For the purpose of brevity, detailed descriptions of known methods are omitted herein. In the foregoing embodiments, several specific operations are described and illustrated as examples. However, the method processes of this disclosure are not limited to the described and illustrated specific operations. A person skilled in the art can make changes, modifications, and additions, or change a sequence of the operations after understanding this disclosure.

Function modules illustrated in the foregoing block diagrams may be implemented as hardware, software, firmware, or a combination thereof. When implemented as hardware, the function modules may be, for example, an electronic circuit, an application specific integrated circuit (ASIC), appropriate firmware, a plug-in, or a function card. When the function modules are implemented as software, elements of this disclosure are programs or code segments that are used to perform required tasks. The programs or code segments can be stored in a machine-readable medium or transmitted on a transmission medium or a communications link by using a data signal carried on a carrier. The "machine-readable medium" may include any medium capable of storing or transmitting information. Examples of the machine-readable medium include an electronic circuit, a semiconductor memory device, a ROM, a flash memory, an erasable ROM (EROM), a floppy disk, a CD-ROM, a compact disc, a hard disk, an optical fiber medium, a radio frequency (RF) link, and the like. The code segments can be downloaded via a computer network such as the internet and an intranet.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this disclosure, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm operations may be implemented by electronic hardware, computer software, or a combination thereof. To clearly describe the interchangeability between the hardware and the software, the foregoing has generally described compositions and operations of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this disclosure, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or the entire content of the units may be selected according to actual requirements to achieve the objectives of the solutions of the embodiments in this disclosure.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely detailed descriptions of the embodiments of this disclosure, but are not intended to limit the protection scope of this disclosure. Any modification or replacement readily figured out by a person skilled in the art within the technical scope disclosed in this disclosure should be within the protection scope of this disclosure. Therefore, the protection scope of this disclosure should be subject to the protection scope of the claims.

What is claimed is:

1. A content deployment method, comprising:
   receiving, by a delivery controller, a content deployment request from an application server controller, wherein the application server controller is a central controller controlling an application server that stores requested content, and wherein the content deployment request is sent by the application server controller to the delivery controller in response to the application server indicating that the requested content is to be deployed to one or more cache servers, and comprises identification information of the requested content and address information of the application server;
   sending, by the delivery controller, a first deployment cache request to a first cache server, wherein the first deployment cache request comprises the identification information of the requested content and the address information of the application server, and the first deployment cache request requests the first cache server to obtain the requested content from the application server and cache the requested content;
   determining, by the delivery controller, segment identification information of the requested content; and
   sending, by the delivery controller, a second deployment cache request to each of at least two second cache servers, wherein the second deployment cache request comprises the identification information of the first cache server and the segment identification information of the requested content, and the second deployment cache request requests the second cache server to obtain a segment of the requested content from the first cache server and cache the segment of the requested content.

2. The content deployment method according to claim 1, wherein the content deployment request further comprises deployment area information, and the method further comprises:
   determining, by the delivery controller, the first cache server from a deployment area indicated by the deployment area information.

3. The content deployment method according to claim 1, wherein the content deployment request further comprises identification information of the first cache server, and the method further comprises:
   determining, by the delivery controller, the first cache server based on the identification information of the first cache server.

4. The content deployment method according to claim 1, wherein the method further comprises:
   sending, by the delivery controller, a third deployment cache request to a third cache server, wherein the third deployment cache request comprises the identification information of the first cache server and the identification information of the requested content, and requests the third cache server to obtain the requested content from the first cache server and cache the requested content.

5. An apparatus comprising:
   at least one processor coupled with a memory, wherein the at least one processor is configured to execute instructions stored in the memory, to cause the apparatus to perform the following operations:
      receiving a content deployment request from an application server controller, wherein the application server controller is a central controller controlling an application server that stores requested content, and wherein the content deployment request is sent by the application server controller to a delivery controller in response to the application server indicating that the requested content is to be deployed to one or more cache servers, and comprises identification information of requested content and address information of the requested content and address information of the application server; and sending a first deployment cache request to a first cache serve, wherein the first deployment cache request comprises the identification information of the requested content and the address information of the application server, and the first deployment cache request is used to request the first cache server to obtain the requested content from the application server and cache the requested content;

determining segment identification information of the requested content;

sending a second deployment cache request to each of at least two second cache servers, wherein the second deployment cache request comprises the identification information of the first cache server and the segment identification information of the requested content, and the second deployment cache request requests the second cache server to obtain a segment of the requested content from the first cache server and cache the segment of the requested content.

6. The apparatus according to claim 5, wherein the content deployment request further comprises deployment area information, and the operations further comprise:

determining the first cache server from a deployment area indicated by the deployment area information.

7. The apparatus according to claim 5, wherein the content deployment request further comprises identification information of the first cache server, and the operations further comprise:

determining the first cache server based on the identification information of the first cache server.

8. The apparatus according to claim 5, wherein the operations further comprise:

sending a second deployment cache request to a second cache server, wherein the second deployment cache request comprises the identification information of the first cache server and the identification information of the requested content, and the second deployment cache request is used to request the second cache server to obtain the requested content from the first cache server and cache the requested content.

9. An apparatus comprising:

at least one processor coupled with a memory, wherein the at least one processor is configured to execute instructions stored in the memory, to cause the apparatus to perform the following operations:

receiving a content deployment request from an application server controller, wherein the application server controller is a central controller controlling an application server that stores requested content, and wherein the content deployment request is sent by the application server controller to a delivery controller in response to the application server indicating that the requested content is to be deployed to one or more cache servers, and comprises identification information of requested content and address information the application server;

determining segment identification information of the requested content; and sending a first deployment cache request to each of at least two first cache servers, wherein the first deployment cache request comprises the address information of the application server and the segment identification information of the requested content, and the first deployment cache request is used to request the first cache server to obtain a segment of the requested content from the application server and cache the segment of the requested content;

sending a second deployment cache request to each of at least two second cache servers, wherein the second deployment cache request comprises the identification information of the first cache server and the segment identification information of the requested content, and the second deployment cache request requests the second cache server to obtain a segment of the requested content from the first cache server and cache the segment of the requested content.

10. The apparatus according to claim 9, wherein the content deployment request further comprises deployment area information, and the operations further comprise:

determining the first cache server from a deployment area indicated by the deployment area information.

11. The apparatus according to claim 9, wherein the content deployment request further comprises identification information of the first cache server, and the operations further comprise:

determining the first cache server based on the identification information of the first cache server.

12. The apparatus according to claim 9, wherein the operations further comprise:

sending, by the delivery controller, a third deployment cache request to a third cache server, wherein the third deployment cache request comprises the identification information of the first cache server and the identification information of the requested content, and requests the third cache server to obtain the requested content from the first cache server and cache the requested content.

\* \* \* \* \*

UNITED STATES PATENT AND TRADEMARK OFFICE
CERTIFICATE OF CORRECTION

PATENT NO. : 11,057,489 B2
APPLICATION NO. : 16/600157
DATED : July 6, 2021
INVENTOR(S) : Renchao Xie et al.

Page 1 of 1

It is certified that error appears in the above-identified patent and that said Letters Patent is hereby corrected as shown below:

In the Claims

In Claim 5, Column 15, Line 2, delete "serve, wherein" and insert --server, wherein--.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*